(12) United States Patent
Thomas

(10) Patent No.: US 11,078,842 B2
(45) Date of Patent: Aug. 3, 2021

(54) EXHAUST DISTRIBUTION MANIFOLD

(71) Applicant: UNITED TECHNOLOGIES CORPORATION, Farmington, CT (US)

(72) Inventor: Michael R. Thomas, Bloomfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 65 days.

(21) Appl. No.: 16/365,235

(22) Filed: Mar. 26, 2019

(65) Prior Publication Data

US 2020/0309034 A1  Oct. 1, 2020

(51) Int. Cl.
*F02C 7/141* (2006.01)
*F02C 7/18* (2006.01)

(52) U.S. Cl.
CPC ............... *F02C 7/141* (2013.01); *F02C 7/18* (2013.01); *F05D 2220/32* (2013.01); *F05D 2260/201* (2013.01)

(58) Field of Classification Search
CPC .. F02C 7/141; F02C 7/18; F02K 3/105; F02K 3/115
See application file for complete search history.

(56) References Cited

U.S. PATENT DOCUMENTS

| | | | | |
|---|---|---|---|---|
| 2,297,239 A * | 9/1942 | Neugebauer | ............... | F02K 7/00 60/225 |
| 2,979,151 A * | 4/1961 | Blackwell | ................ | B64F 1/26 181/217 |
| 8,511,096 B1 * | 8/2013 | Haugen | ..................... | F02C 7/24 60/785 |
| 8,550,208 B1 * | 10/2013 | Potokar | ..................... | F02C 6/08 181/212 |
| 9,458,764 B2 | 10/2016 | Alecu et al. | | |
| 2005/0067218 A1 * | 3/2005 | Bristow | ................ | F01D 17/105 181/237 |
| 2013/0269366 A1 * | 10/2013 | Haugen | .................. | F02K 3/075 60/783 |
| 2015/0114611 A1 * | 4/2015 | Morris | .................... | B23P 15/26 165/166 |
| 2016/0369697 A1 * | 12/2016 | Schwarz | .................. | F02C 9/18 |
| 2017/0175640 A1 * | 6/2017 | Glessner | .................. | F02C 7/24 |
| 2017/0211415 A1 | 7/2017 | Swift et al. | | |

FOREIGN PATENT DOCUMENTS

| | | |
|---|---|---|
| BE | 333617 | 4/1926 |
| NO | 2015096000 | 7/2015 |

OTHER PUBLICATIONS

European Patent Office, European Partial Search Report dated Feb. 16, 2021 in Application No. 20153204.1.

* cited by examiner

*Primary Examiner* — Steven M Sutherland
(74) *Attorney, Agent, or Firm* — Snell & Wilmer L.L.P.

(57) ABSTRACT

A cooling system for a gas turbine engine may comprise a heat exchanger configured to receive a cooling airflow. The heat exchanger may receive the cooling flow at a cooling flow input of the heat exchanger and output the cooling airflow at an exhaust output of the heat exchanger. An exhaust distribution manifold may be fluidly coupled to the exhaust output of the heat exchanger. The exhaust distribution manifold may define a plurality of openings.

19 Claims, 4 Drawing Sheets

EXHAUST DISTRIBUTION MANIFOLD

STATEMENT OF GOVERNMENT INTEREST

This invention was made with Government support awarded by the United States. The Government has certain rights in this invention.

FIELD

The present disclosure relates to gas turbine engines, and, more specifically, to an exhaust distribution manifold for a gas turbine engine.

BACKGROUND

A gas turbine engine typically includes a fan section, a compressor section, a combustor section, and a turbine section. In general, during operation, air is pressurized in the fan and compressor sections and is mixed with fuel and burned in the combustor section to generate hot combustion gases. The hot combustion gases flow through the turbine section, which extracts energy from the hot combustion gases to power the compressor section and other gas turbine engine loads.

Gas turbine engines may include various cooling systems that employ heat exchangers. Bypass air may be directed across the heat exchangers as a cooling fluid. The increase in temperature of the exhaust of the heat exchanger (i.e., the bypass air exiting the heat exchanger) may be too hot for hardware downstream of the heat exchanger. The high temperature heat exchanger exhaust may cause hot spots in and/or damage to the downstream hardware.

SUMMARY

A cooling system for a gas turbine engine is disclosed herein. In accordance with various embodiments, the cooling system may comprise a heat exchanger configured to receive a cooling airflow. The heat exchanger may be configured to receive the cooling airflow at a cooling flow input of the heat exchanger and to output the cooling airflow at a first exhaust output of the heat exchanger. A first exhaust distribution manifold may be fluidly coupled to the first exhaust output of the heat exchanger. The first exhaust distribution manifold may define a plurality of first openings.

In various embodiments, an inlet conduit may be coupled to an inlet of the heat exchanger. A return conduit may be coupled to an outlet of the heat exchanger. In various embodiments, a first end of the first exhaust distribution manifold may have a first diameter and a second end of the first exhaust distribution manifold located opposite the first end may have a second diameter less than the first diameter.

In various embodiments, the plurality of first openings may be formed over approximately 100° of a circumference of the first exhaust distribution manifold. In various embodiments, the plurality of first openings may comprise a first pair of adjacent openings proximate the first end of the first exhaust distribution manifold and a second pair of adjacent openings proximate the second end of the first exhaust distribution manifold. A pitch of the first pair of adjacent openings may be greater than a pitch of the second pair of adjacent openings.

In various embodiments, a second exhaust distribution manifold may be fluidly coupled to a second exhaust output of the heat exchanger. The second exhaust distribution manifold may define a plurality of second openings. In various embodiments, the plurality of first openings and the plurality of second openings may be oriented in a generally aft direction.

In various embodiments, a surface area of a first opening of the plurality of first openings may be greater than a surface area of a second opening of the plurality of first openings.

A gas turbine engine is also disclosed herein. In accordance with various embodiments, the gas turbine engine may comprise an inner engine case structure, an outer engine case structure radially outward of the inner engine case structure, and a cooling system located at least partially between the inner engine case structure and the outer engine case structure. The cooling system may comprise a first heat exchanger configured to receive a cooling airflow and a first exhaust distribution manifold fluidly coupled to a first exhaust output of the first heat exchanger. The first exhaust distribution manifold may define a plurality of first openings.

In various embodiments, the cooling system may further comprise an inlet conduit coupled to an inlet of the first heat exchanger and a return conduit coupled to an outlet of the first heat exchanger.

In various embodiments, the plurality of first openings may be formed over approximately 100° of a circumference of the first exhaust distribution manifold. In various embodiments, a shape of a first opening of the plurality of first openings may be different from a shape of a second opening of the plurality of first openings.

In various embodiments, a first end of the first exhaust distribution manifold may have a first diameter and a second end of the first exhaust distribution manifold located opposite the first end may have a second diameter less than the first diameter. In various embodiments, a pitch of the plurality of first openings decreases in a direction extending from the first end of the first exhaust distribution manifold to the second end of the first exhaust distribution manifold.

In various embodiments, a surface area of a first opening of the plurality of first openings may be greater than a surface area of a second opening of the plurality of first openings. The first opening may be located closer to an inlet end of the first exhaust distribution manifold as compared to the second opening.

In various embodiments, the cooling system may further comprise a second heat exchanger configured to receive the cooling airflow and a second exhaust distribution manifold fluidly coupled to a second exhaust output of the second heat exchanger. The second exhaust distribution manifold may define a plurality of second openings.

An exhaust distribution manifold configured to be fluidly coupled to an exhaust output of a heat exchanger is also disclosed herein. In accordance with various embodiments, the exhaust distribution manifold may comprise a first end defining an inlet of the exhaust distribution manifold and having a first diameter and a second end located opposite the first end and have a second diameter less than the first diameter. A plurality of openings may be formed between the first end and the second end.

In various embodiments, the plurality of openings may be formed over approximately 100° of a circumference of the exhaust distribution manifold.

In various embodiments, a surface area of a first opening of the plurality of openings may be greater than a surface area of a second opening of the plurality of openings. In various embodiments, the first opening may be formed closer to the first end of the exhaust distribution manifold as compared to the second opening.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of a gas turbine engine.

A first component that is "radially outward" of a second component means that the first component is positioned at a greater distance away from a central longitudinal axis of the gas turbine engine. A first component that is "radially inward" of a second component means that the first component is positioned closer to the engine central longitudinal axis than the second component. The terminology "radially outward" and "radially inward" may also be used relative to reference axes other than the engine central longitudinal axis.

Figure 1:
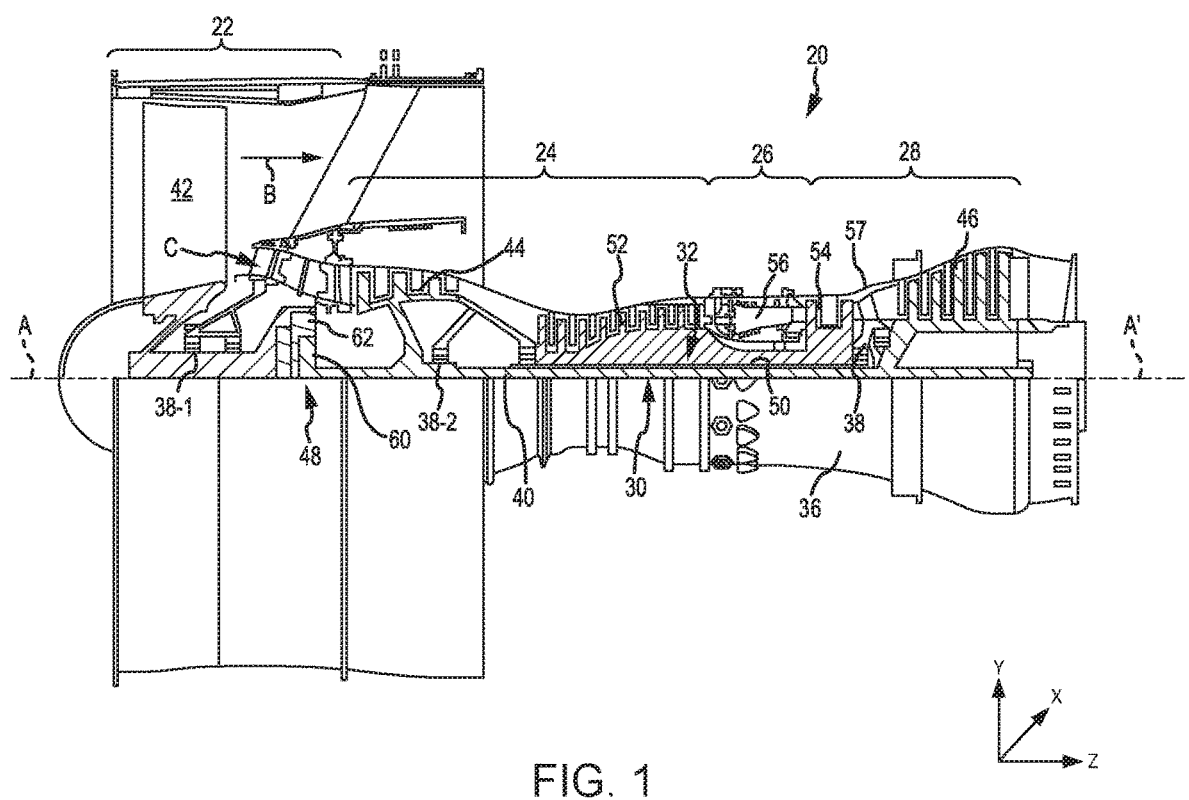
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may generally include a fan section 22, a compressor section 24, a combustor section 26, and a turbine section 28. In operation, fan section 22 drives fluid (e.g., air) along a bypass flow-path B, while compressor section 24 drives fluid along a core flow-path C for compression and communication into combustor section 26 and then expansion through turbine section 28. Although gas turbine engine 20 is depicted as a turbofan gas turbine engine herein, it should be understood that the concepts described herein are not limited to use with turbofans as the teachings may be applied to other types of turbine engines.

Gas turbine engine 20 may generally comprise a low speed spool 30 and a high speed spool 32 mounted concentrically, via bearing systems 38, for rotation about for rotation about engine central longitudinal axis A-A' and relative to an engine static structure 36. It should be understood that various bearing systems 38 at various locations may alternatively or additionally be provided, including for example, bearing system 38, bearing system 38-1, and bearing system 38-2. Engine central longitudinal axis A-A' is oriented in the z direction on the provided xyz axes. The z direction on the provided xyz axes refers to the axial direction. As used herein, the term "radially" refer to directions towards and away from engine central longitudinal axis A-A' and the z-axis. As used herein, the terms "circumferential" and "circumferentially" refer to directions about central longitudinal axis A-A' and the z-axis.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about engine central longitudinal axis A-A', which is collinear with their longitudinal axes. As used herein, a "high pressure" compressor or turbine experiences a higher pressure than a corresponding "low pressure" compressor or turbine. The airflow in core flow-path C may be compressed by low pressure compressor 44 and high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

The compressor section 24, the combustor section 26, and the turbine section 28 are generally referred to as the engine core. Air is drawn into gas turbine engine 20 through fan 42. Air exiting fan 42 may be divided between core flow-path C and bypass flow-path B. The airflow in bypass flow-path B may be utilized for multiple purposes including, for example, cooling and pressurization.

Figure 2A:
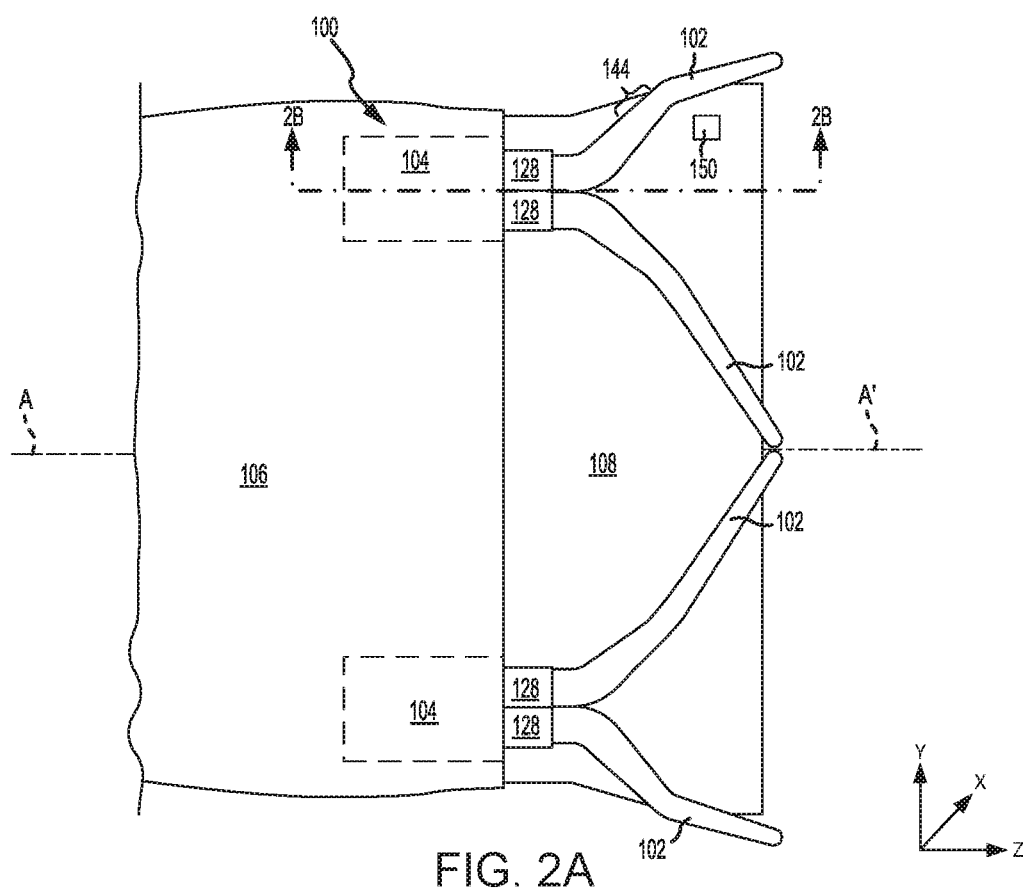
FIG. 2A illustrates a perspective view of a cooling system having an exhaust distribution manifold at an exhaust output of a heat exchanger, in accordance with various embodiments.
Figure 2B:
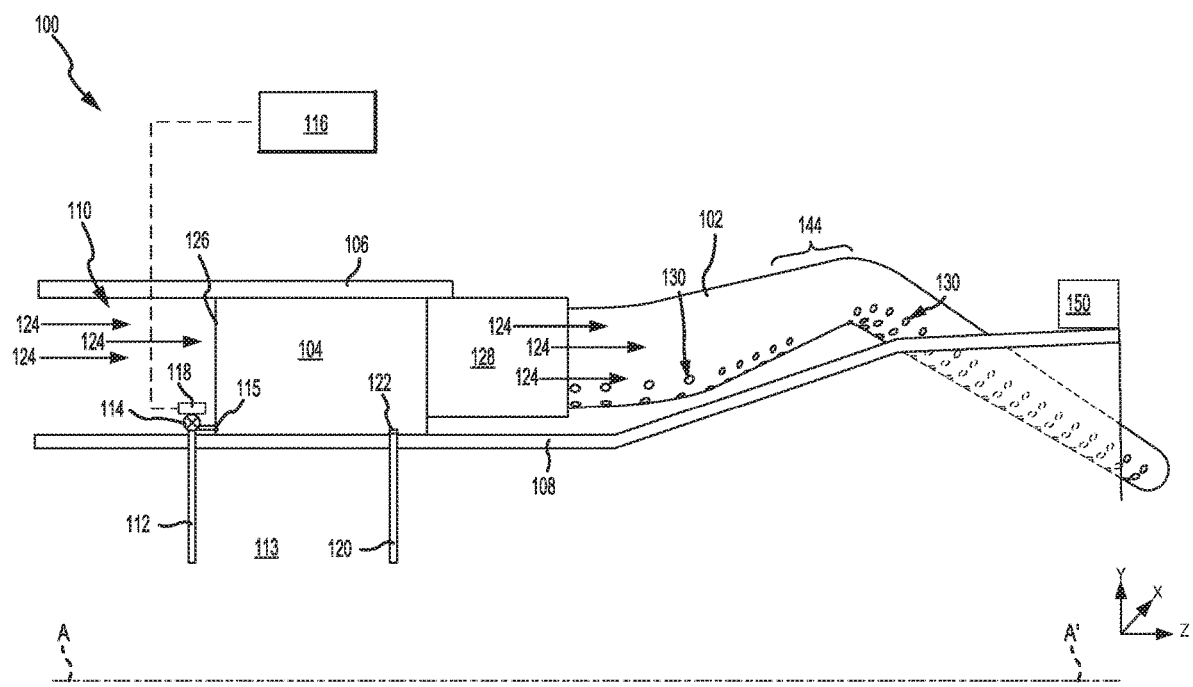
FIG. 2B illustrates a cross-section view of the cooling system in FIG. 2A taken along the line 2B-2B in FIG. 2A, in accordance with various embodiments.

Referring to FIGS. 2A and 2B, and with continued reference to FIG. 1, a cooling system 100 having exhaust distribution manifolds 102 is illustrated, in accordance with various embodiments. Cooling system 100 includes one or more heat exchanger(s) 104. Heat exchanger(s) 104 may be located between an outer engine case structure 106 and an inner engine case structure 108. Outer engine case structure 106 is radially outward of inner engine case structure 108. Outer engine case structure 106 and inner engine case structure 108 may define a generally annular bypass duct 110 around the engine core. In various embodiments, inner engine case structure 108 may form a portion of engine static structure 36. In various embodiments, air discharged from, for example, fan section 22 may be communicated through the bypass duct 110.

In accordance with various embodiments, an inlet conduit 112 may be fluidly coupled between a chamber 113 and each heat exchanger 104. Chamber 113 may be located radially inward of inner engine case structure 108. Inlet conduit 112 directs hot air (i.e., air to be cooled) to heat exchanger 104. In various embodiments, inlet conduit 112 may be downstream of high pressure compressor 52. For example, in various embodiments, inlet conduit 112 may be radially outward of combustor 56. Inlet conduit 112 is fluidly coupled to an inlet 115 of heat exchanger 104. A valve 114 may regulate the flow of air between inlet conduit 112 and inlet 115 of heat exchanger 104. In various embodiments, the position of valve 114 and thus the flow of hot air to heat exchanger 104 may be controlled by a controller 116. For example, controller 116 may send commands to an actuator 118 configured to translate valve 114 between an open position and a closed position. Controller 116 may be a standalone controller or may be incorporated into an overall control for gas turbine engine 20, such as a full authority digital engine control (FADEC). The hot air provided by inlet conduit 112 is cooled in heat exchanger 104 and then returned to chamber 113 through a return conduit 120. Return conduit 120 is fluidly coupled to an outlet 122 of heat exchanger 104. The cooled air in return conduit 120 may be directed downstream to cool components in turbine section 28.

Heat exchanger 104 is configured to receive a cooling airflow, for example, airflow 124. In various embodiments, airflow 124 may be a portion of the bypass airflow in bypass duct 110. Cooling airflow 124 may be directed across heat exchanger 104 to cool the air in heat exchanger 104 (i.e., to cool the air provided by inlet conduit 112). In this regard, airflow 124 may be directed into a cooling flow input 126 of heat exchanger 104. Airflow 124 flows across and/or through heat exchanger 104 to cool the air provided by inlet conduit 112. Airflow 124 is then output from an exhaust output 128 of heat exchanger 104. Stated differently, heat exchanger 104 receives airflow 124 (i.e. a portion of the airflow in bypass duct 110) at cooling flow input 126 and outputs airflow 124 at exhaust output 128.

In various embodiments, heat exchanger 104 may include multiple exhaust outputs 128. For example, in various embodiments, each heat exchanger 104 may include two exhaust outputs 128. While cooling system 100 is illustrated with each heat exchanger 104 including two exhaust outputs 128, it is further contemplated and understood that heat exchangers 104 may include any number of exhaust outputs 128.

In accordance with various embodiments, an exhaust distribution manifold 102 is fluidly coupled to each exhaust output 128. Exhaust distribution manifold 102 is configured to receive airflow 124 output from heat exchanger 104. Stated differently, the airflow 124 output from exhaust output 128 flows into exhaust distribution manifold 102. Exhaust distribution manifolds 102 may extend around a circumference of inner engine case structure 108. Each exhaust distribution manifold 102 defines a plurality of openings 130. Airflow 124 exits exhaust distribution manifold 102 through openings 130. As described in further detail below, the location and/or size of openings 130 is/are selected to more evenly distribute the exhaust (i.e., airflow 124) around inner engine case structure 108 and to encourage better mixing of the exhaust, as compared to cooling systems where the exhaust is output directly from exhaust outputs of the heat exchanger.

Figure 3:
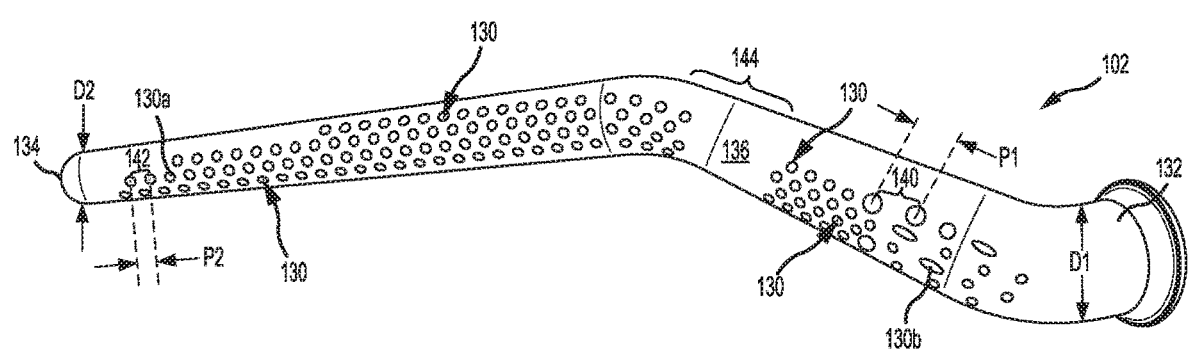
FIG. 3 illustrates an exhaust distribution manifold, in accordance with various embodiments.

Referring to FIG. 3, and with continued reference to FIG. 2B, an exhaust distribution manifold 102 is illustrated, in accordance with various embodiments. Exhaust distribution manifold 102 may comprise a pipe or conduit. In various embodiments, exhaust distribution manifold 102 may be formed from a metal or metal alloy. For example, exhaust distribution manifold 102 may be formed from a stainless steel or nickel-based alloy (e.g., a nickel-chromium alloy that is sold under the mark INCONEL® 625, or a nickel-chromium-iron alloy that is sold under the mark INCONEL® 620).

In various embodiments, exhaust distribution manifold 102 may include a "tusk" shape. In this regard, exhaust distribution manifold 102 may be tapered such that an inlet (or first) end 132 of exhaust distribution manifold 102 has a diameter D1 and a distal (or second) end 134 of exhaust distribution manifold 102 has a diameter D2 that is less than diameter D1. With combined reference to FIG. 2A and FIG. 3, inlet end 132 may be attached to exhaust output 128 of heat exchanger 104. Distal end 134 may be located aft of inlet end 132. Distal end 134 may be circumferentially offset from inlet end 132. In various embodiments, the circumferential offset between distal end 134 and inlet end 132 may be approximately 45°. Stated differently, each exhaust distribution manifold 102 may extend over approximately 45° of a circumference of inner engine case structure 108. As used in the previous context, "approximately" means ±5°. The circumferential offset of each exhaust distribution manifold 102 (i.e., the circumferential distance covered by each exhaust distribution manifold 102) is dependent on the number of heat exchangers 104 in cooling system 100 and the number of exhaust distribution manifolds 102 per heat exchanger 104. For example, in a cooling system having five heat exchangers 104 and two exhaust distribution manifolds 102 per heat exchanger, the exhaust distribution manifolds 102 may each extend over approximately 36° of the circumference of inner engine case structure 108; in a cooling system having three heat exchangers 104 and two exhaust distribution manifolds 102 per heat exchanger, the exhaust distribution manifolds 102 may each extend over approximately 60° of the circumference of inner engine case structure 108.

The geometry or shape of exhaust distribution manifold 102 may be configured to mirror the geometry or shape of the inner engine case structure 108. For example, the angle of inner engine case structure 108 relative to engine central longitudinal axis A-A' may be approximately equal to the angle of exhaust distribution manifold 102 relative to engine central longitudinal axis A-A'. As used in the previous context, "approximately" means ±5°.

Returning to FIG. 3, and with continued reference to FIG. 2B, the location of openings 130 is selected such that openings 130 will be oriented in a generally aft direction. As used in the previous context, "generally aft" refers to a direction ±50° from engine central longitudinal axis A-A'. In this regard, openings 130 may be formed over approximately 100° of a circumference of exhaust distribution manifold 102. As used in the previous context, "approximately" means ±5°. For example, openings 130 may be formed between −50° and +50° as measured around the outer circumferential surface 136 of exhaust distribution manifold 102 and relative to a plane parallel with engine central longitudinal axis A-A'.

In various embodiments, a pitch of openings 130 (i.e., a distance between adjacent openings) may vary along exhaust distribution manifold 102. For example, a pitch P1 of a first pair of adjacent openings 140 located proximate inlet end 132 of exhaust distribution manifold 102 may be greater than a pitch P2 of a second pair of adjacent openings 142 located proximate distal end 134 of exhaust distribution manifold 102. Stated differently, the distance between adjacent openings 130 proximate inlet end 132 may be greater than the distance between adjacent openings 130 proximate distal end 134. Stated yet another way, in various embodiments, the distance between adjacent openings 130 (i.e., a pitch of openings 130) may decrease in a direction extending from inlet end 132 to distal end 134 of exhaust distribution manifold 102.

Figure 4A:
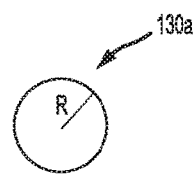
FIGS. 4A and 4B illustrate openings of an exhaust distribution manifold, in accordance with various embodiments.
Figure 4B:
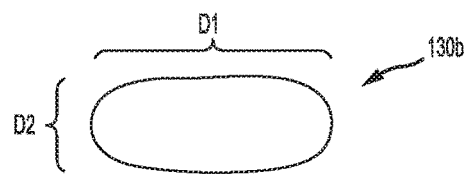

In various embodiments, openings 130 may vary in shape and/or surface area along exhaust distribution manifold 102. For example, and with combined reference to FIG. 3 and FIGS. 4A and 4B, a first opening 130a may comprise a generally circular shape having a radius R and a second opening 130b may comprise a generally oblong shape, wherein a first dimension D1 of second opening 130b is greater than a second dimension D2 of second openings 130b. In various embodiments, the surface area of second opening 130b (i.e., the area defined by exhaust distribution manifold 102) may be greater than the surface area of first opening 130a. In various embodiments, openings 130 with greater surface area may be located closer to inlet end 132 of exhaust distribution manifold 102. While openings 130 having greater surface area are illustrated as proximate inlet end 132, it is contemplated and understood that the location, shape, and size (i.e., surface area) of openings 130 may be selected such that the flow rate of airflow 124 exiting openings 130 will be approximately equal across exhaust distribution manifold 102. As used in the previous context, "approximately" means ±5%.

In various embodiments, a portion 144 of exhaust distribution manifold 102 may be devoid of openings 130. The location of portion 144 may be selected based on engine hardware located downstream (i.e., aft) of exhaust distribution manifold 102. For example, and with combined reference to FIGS. 2A and 2B, the location of portion 144 may coincide with (e.g., may be axially aligned with) the location of hardware component 150. It may be desirable for hardware component 150 to not be in the path of the hot exhaust airflow 124 exiting openings 130. In this regard, portion 144 being devoid of openings 130 may reduce the exposure of hardware component 150 to hot exhaust airflow 124.

Cooling system 100 including exhaust distribution manifolds 102 may more evenly distribute the exhaust (i.e., airflow 124) exiting heat exchangers 104 around inner engine case structure 108. A more evenly distributed exhaust may encourage a better mixing of the exhaust, as compared to cooling systems where the exhaust is output directly from the heat exchangers. Cooling system 100 including exhaust distribution manifolds 102 may reduce a temperature gradient across inner engine case structure 108 and/or may decrease the temperature of the exhaust contacting inner engine case structure 108 and other temperature sensitive hardware downstream of bypass duct 110. A reduced temperature gradient and/or decreased exhaust temperature may reduce structural deformations of inner engine case structure 108 and the thermomechanical stresses associated therewith.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cooling system for a gas turbine engine, comprising:
a heat exchanger configured to receive a cooling airflow, wherein the heat exchanger is configured to receive the cooling airflow at a cooling flow input of the heat exchanger, and wherein the heat exchanger is configured to output the cooling airflow at a first exhaust output of the heat exchanger;
a first exhaust distribution manifold fluidly coupled to the first exhaust output of the heat exchanger, wherein the first exhaust distribution manifold defines a plurality of first openings; and
a second exhaust distribution manifold fluidly coupled to a second exhaust output of the heat exchanger, wherein the second exhaust distribution manifold defines a plurality of second openings.

2. The cooling system of claim 1, further comprising:
an inlet conduit coupled to an inlet of the heat exchanger; and
a return conduit coupled to an outlet of the heat exchanger.

3. The cooling system of claim 2, wherein a first end of the first exhaust distribution manifold has a first diameter and a second end of the first exhaust distribution manifold located opposite the first end has a second diameter less than the first diameter.

4. The cooling system of claim 3, wherein the plurality of first openings are formed over approximately 100° of a circumference of the first exhaust distribution manifold.

5. The cooling system of claim 3, wherein the plurality of first openings comprises a first pair of adjacent openings proximate the first end of the first exhaust distribution manifold and a second pair of adjacent openings proximate the second end of the first exhaust distribution manifold, and wherein a pitch of the first pair of adjacent openings is greater than a pitch of the second pair of adjacent openings.

6. The cooling system of claim 1, wherein the plurality of first openings and the plurality of second openings are oriented in a generally aft direction.

7. The cooling system of claim 1, wherein a surface area of a first opening of the plurality of first openings is greater than a surface area of a second opening of the plurality of first openings.

8. A gas turbine engine, comprising:
an inner engine case structure;
an outer engine case structure radially outward of the inner engine case structure; and
a cooling system located at least partially between the inner engine case structure and the outer engine case structure, the cooling system comprising:
a first heat exchanger configured to receive a cooling airflow; and
a first exhaust distribution manifold fluidly coupled to a first exhaust output of the first heat exchanger, wherein the first exhaust distribution manifold defines a plurality of first openings, and wherein a distal end of the first exhaust distribution manifold is circumferentially offset from an inlet end of the first exhaust distribution manifold.

9. The gas turbine engine of claim 8, wherein the cooling system further comprises:
an inlet conduit coupled to an inlet of the first heat exchanger; and
a return conduit coupled to an outlet of the first heat exchanger.

10. The gas turbine engine of claim 8, wherein the plurality of first openings are formed over approximately 100° of a circumference of the first exhaust distribution manifold.

11. The gas turbine engine of claim 10, wherein the inlet end of the first exhaust distribution manifold has a first diameter and the distal end of the first exhaust distribution manifold has a second diameter less than the first diameter.

12. The gas turbine engine of claim 11, wherein a pitch of the plurality of first openings decreases in a direction extending from the inlet end of the first exhaust distribution manifold to the distal end of the first exhaust distribution manifold.

13. The gas turbine engine of claim 8, wherein a shape of a first opening of the plurality of first openings is different from a shape of a second opening of the plurality of first openings.

14. The gas turbine engine of claim 8, wherein a surface area of a first opening of the plurality of first openings is greater than a surface area of a second opening of the plurality of first openings, and wherein the first opening is located closer to the inlet end of the first exhaust distribution manifold as compared to the second opening.

15. The gas turbine engine of claim 8, wherein the cooling system further comprises
a second heat exchanger configured to receive the cooling airflow; and
a second exhaust distribution manifold fluidly coupled to a second exhaust output of the second heat exchanger, wherein the second exhaust distribution manifold defines a plurality of second openings.

16. The gas turbine engine of claim 8, wherein the cooling system further comprises a second exhaust distribution manifold fluidly coupled to a second exhaust output of the first heat exchanger, wherein the second exhaust distribution manifold defines a plurality of second openings.

17. An exhaust distribution manifold configured to be fluidly coupled to an exhaust output of a heat exchanger, the exhaust distribution manifold comprising:
a first end defining an inlet of the exhaust distribution manifold and having a first diameter;
a second end located opposite the first end and have a second diameter less than the first diameter, wherein the second end is circumferentially offset from the first end; and
a plurality of openings formed between the first end and the second end, wherein the plurality of openings are formed over approximately 100° of a circumference of the exhaust distribution manifold, and wherein approximately 260° of the circumference of the exhaust distribution manifold is devoid of openings.

18. The exhaust distribution manifold of claim 17, wherein a surface area of a first opening of the plurality of openings is greater than a surface area of a second opening of the plurality of openings.

19. The exhaust distribution manifold of claim 18, wherein the first opening is formed closer to the first end of the exhaust distribution manifold as compared to the second opening.

* * * * *